US012150466B2

(12) United States Patent
Ludwig et al.

(10) Patent No.: US 12,150,466 B2
(45) Date of Patent: Nov. 26, 2024

(54) FERMENTED FORMULA WITH NON DIGESTIBLE OLIGOSACCHARIDES

(71) Applicant: N.V. Nutricia, Zoetermeer (NL)

(72) Inventors: Thomas Ludwig, Utrecht (NL); Houkje Bouritius, Utrecht (NL); Donghui Yu, Utrecht (NL)

(73) Assignee: Nutricia N.V., Zoetermeer (NL)

( * ) Notice: Subject to any disclaimer, the term of this patent is extended or adjusted under 35 U.S.C. 154(b) by 36 days.

(21) Appl. No.: 15/033,543

(22) PCT Filed: Nov. 4, 2014

(86) PCT No.: PCT/NL2014/050762
§ 371 (c)(1),
(2) Date: Apr. 29, 2016

(87) PCT Pub. No.: WO2015/065194
PCT Pub. Date: May 7, 2015

(65) Prior Publication Data
US 2016/0278414 A1  Sep. 29, 2016

(30) Foreign Application Priority Data
Nov. 4, 2013  (EP) .................................... 13191392

(51) Int. Cl.
A23L 33/00    (2016.01)
A23L 33/135   (2016.01)
A23L 33/21    (2016.01)

(52) U.S. Cl.
CPC ............. *A23L 33/40* (2016.08); *A23L 33/135* (2016.08); *A23L 33/21* (2016.08); *A23V 2002/00* (2013.01)

(58) Field of Classification Search
CPC ........ A23L 33/40; A23L 33/21; A23L 33/135; A23L 33/10
See application file for complete search history.

(56) References Cited

U.S. PATENT DOCUMENTS

| | | | |
|---|---|---|---|
| 4,110,476 A | 8/1978 | Rhodes | |
| 4,617,190 A * | 10/1986 | Montgomery | A23C 9/1213 426/588 |
| 6,358,521 B1 | 3/2002 | Izvekova et al. | |
| 7,410,653 B1 | 8/2008 | Blareau et al. | |
| 8,119,379 B2 | 2/2012 | Blareau et al. | |
| 8,715,769 B2 | 5/2014 | Schmitt et al. | |
| 9,617,327 B2 * | 4/2017 | Ludwig | A61K 31/702 |
| 2004/0072794 A1 | 4/2004 | Kaup et al. | |
| 2004/0258825 A1 | 12/2004 | Ndife et al. | |
| 2005/0180962 A1 | 8/2005 | Raz et al. | |
| 2006/0018890 A1 | 1/2006 | Isolauri et al. | |
| 2006/0233773 A1 | 10/2006 | Herz et al. | |
| 2007/0104700 A1 | 5/2007 | Garcia-Rodenas et al. | |
| 2007/0160589 A1 | 7/2007 | Mattson | |
| 2008/0248056 A1 | 10/2008 | Petay et al. | |
| 2008/0268099 A1 | 10/2008 | Blareau et al. | |
| 2010/0221226 A1 | 9/2010 | Aubert-Jacquin et al. | |
| 2010/0278781 A1 | 11/2010 | Hougee et al. | |
| 2011/0097437 A1 | 4/2011 | Knol et al. | |
| 2011/0182934 A1 | 7/2011 | Potappel-van 'T Land et al. | |
| 2012/0171165 A1 * | 7/2012 | Buck | A61K 31/702 424/93.4 |
| 2013/0189398 A1 | 7/2013 | Rosado Loria et al. | |

FOREIGN PATENT DOCUMENTS

| | | |
|---|---|---|
| EP | 1 020 123 A1 | 7/2000 |
| EP | 1 145 643 A1 | 10/2001 |
| EP | 1 320 375 B1 | 6/2003 |
| EP | 1 364 586 A1 | 11/2003 |
| EP | 1 535 520 A1 | 6/2005 |
| EP | 1 597 978 A1 | 11/2005 |
| EP | 1 685 763 A1 | 8/2006 |
| EP | 1 776 877 A1 | 4/2007 |
| EP | 1 815 755 B1 | 8/2007 |
| EP | 2 520 181 A1 | 11/2012 |
| WO | WO-01/01785 A1 | 1/2001 |
| WO | WO-01/64225 | 9/2001 |
| WO | WO-0193915 A1 * 12/2001 ......... A61K 49/0004 |
| WO | WO-02/26242 A2 | 4/2002 |
| WO | WO-2004/052121 A1 | 6/2004 |
| WO | WO-2004/069156 A2 | 8/2004 |
| WO | WO-2004/093898 A2 | 11/2004 |
| WO | WO-2004/093899 A1 | 11/2004 |
| WO | WO-2004/112509 A2 | 12/2004 |
| WO | WO-2005/039319 A2 | 5/2005 |
| WO | WO-2005/039597 A2 | 5/2005 |
| WO | WO-2006/069918 A1 | 7/2006 |
| WO | WO-2006/087391 A1 | 8/2006 |
| WO | WO-2006/091103 A2 | 8/2006 |
| WO | WO-2007/045502 A1 | 4/2007 |

(Continued)

OTHER PUBLICATIONS

European Search Report in Application No. 08168054.8 dated May 8, 2009, pp. 1-5.

Fanaro et al., "Galacto-oligosaccharides and long-chain fructo-oligosaccharides as prebiotics in infant formulas: A review", Acta Paediatrica, 94 (Suppl 449), 2005, 22-26.

Grönlund, Minna-Maija, et al., "Fecal Microflora in Healthy Infants Born by Different Methods of Delivery: Permanent Changes in Intestinal Flora After Cesarean Delivery," Journal of Pediatric Gastroenterology and Nutrition, 28(1):19-25 (1999).

Heyman et al., "Effects of specific lactic acid bacteria on the intestinal permeability to macromolecules and the inflammatory condition," ACTA Paediatrica, vol. 94 (Suppl. 449), pp. 34-36 (2005).

(Continued)

*Primary Examiner* — Vera Stulii
(74) *Attorney, Agent, or Firm* — Foley & Lardner LLP; Gilberto M. Villacorta

(57) ABSTRACT

The present invention relates to a fermented infant or follow on formula comprising non digestible oligosaccharides for decreasing duration of crying, reducing crying episodes, and incidence of colics in infants.

11 Claims, No Drawings

(56) References Cited

FOREIGN PATENT DOCUMENTS

| WO | WO-2007/046698 A1 | 4/2007 |
| --- | --- | --- |
| WO | WO-2007/067053 A1 | 6/2007 |
| WO | WO-2008/153377 A1 | 12/2008 |
| WO | WO-2008/153391 A2 | 12/2008 |
| WO | WO-2009/151329 A1 | 12/2009 |
| WO | WO-2009/151330 A1 | 12/2009 |
| WO | WO-2010/008278 A1 | 1/2010 |
| WO | WO-2010/070613 A2 | 6/2010 |
| WO | WO-2012/078039 A1 | 6/2012 |

OTHER PUBLICATIONS

International Preliminary Report on Patentability dated Oct. 1, 2010, in PCT/NL2009/050330, pp. 1-7.
International Preliminary Report on Patentability in Application No. PCT/NL2008/050375 dated Dec. 13, 2010, pp. 1-8.
International Preliminary Report on Patentability in Application No. PCT/NL2009/050332 dated Oct. 5, 2010, pp. 1-6.
International Search Report in PCT/NL2009/050333 dated Aug. 14, 2009, pp. 1-6.
International Search Report in PCT/NL2009/050330 dated Sep. 16, 2009, pp. 1-6.
Life Start®—Dairy (1.25 oz. powder), Natren, the Probiotic Specialist Recognized Worldwide, 2 pgs., (2006).
McVay et al., "Formula Fortified With Live Probiotic Culture Reduces Pulmonary and Gastrointestinal Bacterial Colonization and Translocation in a Newborn Animal Model," Journal of Pediatric Surgery, 43:25-29 (2008).
Petay et al., ( WO 2004093899 )—Google Machine Translation WIPO, pp. 1-7 printed Sep. 2012.
Prosky L, et al., "Determination of Insoluble, Soluble, and Total Dietary Fiber in Foods and Food Products: Interlaboratory Study," J. Assoc. Off. Anal. Chem., 1988, vol. 71, No. 5, pp. 1017-1023.
Reeves P, et al., "Development and Testing of the AIN-93 Purified Diets for Rodents: Results on Growth, Kidney Calcification and Bone Mineralization in Rats and Mice," Journal of Nutrition, 1993, pp. 1923-1993, vol. 123, No. 11.
Sambrook, J., et al.. "Molecular Cloning, A Laboratory Manual," 2nd ed., Cold Spring Harbor (N.Y.) Laboratory Press, 1989, pp. 1-27.
Scardovi V., "Genus Bifidobacterium Orla-Jensen 1924, 472AL," In: Bergey's Manual of Systematic Bacteriology, vol. 2, Williams & Wilkins, Baltimore, 1984, pp. 1418-1434.
Menard et al. "Bifidobacterium breve and *Streptococcus thermophiles* secretion products enhance T helper 1 immune response and intestinal barrier in mice", 2005, Exp. Biol. Med. vol. 230, pp. 749-756.
International Search Report issued in PCT/NL2011/050832 mailed Feb. 21, 2012, pp. 1-4.
Thibault H. et al. "Effects of Long-Term Consumption of a Fermented Infant Formula (With *Bifidobacterium breve* C50 and *Streptococcus thermophilus* 065) on Acute Diarrhea in Healthy Infants", Journal of Pediatric Gastroenterology and Nutrition, Raven Press, New York, NY vol. 39, No. 2, Aug. 1, 2004, pp. 1-6.
International Search Report issued in International Patent Application No. PCT/NL2014/050762, mailed Dec. 23, 2014, pp. 1-4.
Savino et al., "Reduction of crying episodes owing to infantile colic: a randomized controlled study on the efficacy of a new infant formula", European Journal of Clinical Nutrition, 2006, vol. 60, pp. 1304-1310.
U.S. Appl. No. 14/952,440, Unpublished.
U.S. Appl. No. 12/997,527, US 2011-0182934.
U.S. Appl. No. 13/991,802, US 2013-0337105.
U.S. Appl. No. 14/407,907, US 2015-0132365.
Alm, "Effects of fermentation on curd size and digestibility of milk proteins in vitro of Swedish fermented milk products", Journal of Dairy Science, Apr. 1982, vol. 65, No. 4, pp. 509-514.
Kirjavainen et al., "Probiotic Bacteria in the Management of Atopic Disease: Underscoring the Importance of Viability," Journal of Pediatric Gastoenterology and Nutrition, 36:223-227 (2003).
Vass, A. et al., "Experimental Study of the Nutritional Biological Characters of Fermented Milks," Acta Medica Hungarica, vol. 41, Nos. 2-3, pp. 157-161, 1984.
Vergnolle, "Clinical relevance of proteinase activated receptors (PARS) in the gut", Gut, 2005, vol. 54, pp. 867-874.
Alm et al., "Effect of Fermentation on L(+) and D(-) Lactic Acid in Milk", J Dairy Sci, vol. 65, 1982, pp. 515-520 (6 pages).
Reeves P., "Components of the AIN-93 Diets as Improvements in the AIN-76A Diet", The Journal of Nutrition, 1997, (4 pages).

\* cited by examiner

FERMENTED FORMULA WITH NON DIGESTIBLE OLIGOSACCHARIDES

CROSS REFERENCE TO RELATED APPLICATIONS

This application is the National Phase of International Patent Application No. PCT/NL2014/050762, filed Nov. 4, 2014, published on May 7, 2015 as WO 2015/065194 A1, which claims priority to European Patent Application No. 13191392.3, filed Nov. 4, 2013. The contents of these applications are herein incorporated by reference in their entirety.

FIELD OF THE INVENTION

The present invention is in the field of infant nutrition.

BACKGROUND OF THE INVENTION

After birth the digestive tract of an infant has to adapt to full enteral feeding. At the same time the still immature digestive tract has to develop and mature. Human milk is the preferred method of feeding for infants. However, there are circumstances that make breast-feeding impossible or less desirable. In those cases infant formulae can be considered an alternative. The composition of modern infant formulae is adapted in such a way that it meets many of the special nutritional requirements of the fast growing and developing infant.

Infantile colic is a widespread clinical problem in infants. It is the cause of 10 to 20% of all early pediatrician visits and often leads to parental exhaustion and stress. An increased risk of maternal postpartum depression has been observed. Infantile colic is observed in 10 to 30% of the infants, who are otherwise healthy. Typically colic in an infant occurs between the age of 2 weeks to 4 months.

The causes of infantile colics are not fully understood, and this makes it difficult to find a good prevention or treatment. Anticholinergic drugs such as dicyclomine and dicycloverine are sometimes used, but they are not recommended because of their serious side effects. The role of nutrition has been the subject of research, and in those cases where cow's milk allergy is the underlying cause of the colics, a hypoallergenic formula may solve the problem. However, cow's milk allergy is only present in a small population of the infants suffering from colics.

EP 2 520 181 discloses the use of a fermented or partly fermented infant formula for promoting gut health, including amongst others the treatment and/or prevention of colics or cramps. Savino et al, 2006, Eur J Clin Nutr 60, 1304-1310, disclose that the use of a partially hydrolysed formula supplemented with fructo- and galacto-oligosaccharides and comprising low lactose and increased palmitic acid at the beta position induces a reduction in colic episodes, measured as crying episodes, in infants with colics after 7 and 14 days. EP1685763 disclosed the use of a combination of GOS and polyfructose for amongst others colic and/or abdominal cramps. WO 2010/008278 discloses the use of antibiotics or probiotics for the treatment of gut motility disorders.

SUMMARY OF THE INVENTION

The present inventors found that when a partly fermented infant formula comprising at least 2 non digestible oligosaccharides was administered to infants, the incidence of colics and the number of crying episodes per day was statistically significantly reduced compared to controls that contained either only a partly fermented infant formula without non-digestible oligosaccharides, or a non-fermented infant formula that contained non-digestible oligosaccharides. The reduction was unexpectedly much higher than observed when partly fermented infant formula without non digestible oligosaccharides were given, or when non-fermented infant formula with non digestible oligosaccharides were given.

DETAILED DESCRIPTION OF THE INVENTION

Thus, the present invention concerns a method for reducing the incidence of colics in an infant, comprising administering to said infant an infant formula or follow on formula comprising:
- a fermented ingredient, in particular a composition fermented by lactic acid bacteria,
- 0.5 to 20 wt. % non digestible oligosaccharides based on dry weight of the infant formula or follow on formula, and
- 0.25 to 1.5 wt. % of the sum of lactate and lactic acid based on dry weight of the infant formula or follow on formula, wherein the sum of L-lactic acid and L-lactate is more than 50 wt. % based on the sum of total lactic acid and lactate.

In other words, the present invention concerns the use of a fermented ingredient, in particular a composition fermented by lactic acid bacteria, and non-digestible oligosaccharides in the manufacture of an infant or follow on formula for use in reducing the incidence of colics in an infant, wherein the infant formula or follow on formula comprises:
- 0.5 to 20 wt. % non digestible oligosaccharides based on dry weight of the infant formula or follow on formula, and
- 0.25 to 1.5 wt. % of the sum of lactate and lactic acid based on dry weight of the infant formula or follow on formula, wherein the sum of L-lactic acid and L-lactate is more than 50 wt. % based on the sum of total lactic acid and lactate.

The invention can also be worded as an infant formula or follow on formula comprising:
- a fermented ingredient, in particular a composition fermented by lactic acid bacteria,
- 0.5 to 20 wt. % non digestible oligosaccharides based on dry weight of the infant formula or follow on formula, and
- 0.25 to 1.5 wt. % of the sum of lactate and lactic acid based on dry weight of the infant formula or follow on formula, wherein the sum of L-lactic acid and L-lactate is more than 50 wt. % based on the sum of total lactic acid and lactate, for use in reducing the incidence of colics in an infant.

Preferably, the infant formula or follow on formula is for providing nutrition to an infant with an age of 6 months or below. In one embodiment, the infant is suffering from colics or is at risk of developing colics. In one embodiment, the infant is suffering from colics.

The present invention also concerns a method for reducing the number of crying episodes per day in an infant, comprising administering to said infant an infant formula or follow on formula comprising:

a fermented ingredient, in particular a composition fermented by lactic acid bacteria, 0.5 to 20 wt. % non digestible oligosaccharides based on dry weight of the infant formula or follow on formula, and 0.25 to 1.5 wt. % of the sum of lactate and lactic acid based on dry weight of the infant formula or follow on formula, wherein the sum of L-lactic acid and L-lactate is more than 50 wt. % based on the sum of total lactic acid and lactate.

In other words, the invention also concerns the use of a fermented ingredient, in particular a composition fermented by lactic acid bacteria, and non-digestible oligosaccharides in the manufacture of an infant or follow on formula for use in reducing the number of crying episodes per day in the infant, wherein the infant formula or follow on formula comprises:

0.5 to 20 wt. % non digestible oligosaccharides based on dry weight of the infant formula or follow on formula, and 0.25 to 1.5 wt. % of the sum of lactate and lactic acid based on dry weight of the infant formula or follow on formula, wherein the sum of L-lactic acid and L-lactate is more than 50 wt. % based on the sum of total lactic acid and lactate.

The invention can also be worded as an infant formula or follow on formula comprising:

a fermented ingredient, in particular a composition fermented by lactic acid bacteria, 0.5 to 20 wt. % non digestible oligosaccharides based on dry weight of the infant formula or follow on formula, and 0.25 to 1.5 wt. % of the sum of lactate and lactic acid based on dry weight of the infant formula or follow on formula, wherein the sum of L-lactic acid and L-lactate is more than 50 wt. % based on the sum of total lactic acid and lactate, for use in reducing the number of crying episodes per day in an infant.

In one embodiment, the use for reducing the number of crying episodes per day is for reducing the incidence of colics in the infant.

The term reducing the number of crying episodes per day can also be referred to as reducing crying.

The present invention also concerns a method for decreasing the duration of crying in an infant, comprising administering to said infant an infant formula or follow on formula comprising:

a fermented ingredient, in particular a composition fermented by lactic acid bacteria, 0.5 to 20 wt. % non digestible oligosaccharides based on dry weight of the infant formula or follow on formula, and 0.25 to 1.5 wt. % of the sum of lactate and lactic acid based on dry weight of the infant formula or follow on formula, wherein the sum of L-lactic acid and L-lactate is more than 50 wt. % based on the sum of total lactic acid and lactate.

In other words, the invention also concerns the use of a fermented ingredient, in particular a composition fermented by lactic acid bacteria, and non-digestible oligosaccharides in the manufacture of an infant or follow on formula for use in decreasing the duration of crying in the infant, wherein the infant formula or follow on formula comprises:

0.5 to 20 wt. % non digestible oligosaccharides based on dry weight of the infant formula or follow on formula, and 0.25 to 1.5 wt. % of the sum of lactate and lactic acid based on dry weight of the infant formula or follow on formula, wherein the sum of L-lactic acid and L-lactate is more than 50 wt. % based on the sum of total lactic acid and lactate.

The invention can also be worded as an infant formula or follow on formula comprising:

a fermented ingredient, in particular a composition fermented by lactic acid bacteria, 0.5 to 20 wt. % non digestible oligosaccharides based on dry weight of the infant formula or follow on formula, and 0.25 to 1.5 wt. % of the sum of lactate and lactic acid based on dry weight of the infant formula or follow on formula, wherein the sum of L-lactic acid and L-lactate is more than 50 wt. % based on the sum of total lactic acid and lactate, for use in decreasing the duration of crying in an infant.

In one embodiment, the use for decreasing the duration of crying is for reducing the incidence of colics in the infant.

Preferably, the infant formula or follow on formula is for providing nutrition to an infant with an age of 6 months or below. In one embodiment, the infant is suffering from crying episodes or is at risk of developing crying episodes. In one embodiment, the infant is suffering from crying episodes.

Fermented Ingredient

Fermentation is the process of deriving energy from the oxidation of carbohydrates, such as the lactose present in milk, using an endogenous electron acceptor, which is usually an organic compound. This is in contrast to cellular respiration, where electrons are donated to an exogenous electron acceptor, such as oxygen, via an electron transport chain. In the present invention, fermentation of a composition by lactic acid producing bacteria has the common meaning of the conversion of carbohydrates present in the composition to organic acids. These organic acids formed may comprise, besides lactic acid, also other organic acids such as acetic acid. In the context of the present invention, organic acids are understood to include the corresponding conjugate bases (e.g. lactic acid may include lactate and acetic acid may include acetate).

Thus, according to the present invention, a fermented ingredient is used. The fermented ingredient is a composition that is fermented by lactic acid bacteria. Preferably the composition that is fermented by lactic acid bacteria comprises lactose and/or protein, preferably the composition that is fermented by lactic acid bacteria comprises at least lactose. In a further preferred embodiment, the composition that is fermented by lactic acid bacteria comprises lactose and protein. More preferably, the composition that is fermented by lactic acid bacteria is a milk-derived composition. The carbohydrate that is fermented is preferably lactose. In the context of this invention, wherever 'fermented' is mentioned. 'fermented by lactic acid bacteria' is meant.

Lactic acid bacteria are also referred to as lactic acid producing bacteria and include bacteria of the genus *Streptococcus, Lactococcus, Lactobacillus, Leuconostoc, Enterococcus, Oenococcus, Pediococcus*, and *Bifidobacterium.*

According to the present invention, the infant or follow on formula comprises a fermented ingredient. The infant or follow on formula in the method or use according to the present invention, preferably comprises a fermented milk-derived composition. This fermented milk-derived composition is obtained by incubation of a combination of milk, e.g. skim milk, or a milk-derived product, e.g. whey, with at least one strain of lactic acid bacterium, such as *lactococci,*

*lactobacilli, streptococci* and *bifidobacteria*, preferably the fermented milk-derived composition is obtained by incubation with at least one strain selected from *lactococci, lactobacilli* and *streptococci*, preferably with at least one strain selected from *streptococci*. Preferably lactic acid bacteria which perform homolactic fermentation are used for fermentation, since in this case two lactic acid molecules are produced per sugar moiety and no gas is formed. Homolactic lactic acid bacteria include *Streptococcus thermophilus, Lactococcus* species, preferably *Lactococcus lactis*, and Group I *lactobacilli* such as *Lactobacillus acidophilus, Lactobacillus helveticus* and *Lactobacillus salivarius* and facultative heterofermentative *Lactobacilli* which produce two lactic acid from hexose sugars, and which include *Lactobacillus casei, Lactobacillus paracasei, Lactobacillus rhamnosus, Lactobacillus plantarum, Lactobacillus sakei*. Thus in one embodiment, preferably the fermented milk-derived composition is obtained by incubation of a combination of milk, e.g. skim milk, or a milk derived product, e.g. whey, with at least one strain selected from *Streptococcus thermophilus, Lactococcus lactis, Lactobacillus acidophilus, Lactobacillus helveticus, Lactobacillus salivarius, Lactobacillus casei, Lactobacillus paracasei, Lactobacillus rhamnosus, Lactobacillus plantarum* and *Lactobacillus sakei*, preferably the fermented milk-derived composition is obtained by incubation with *Streptococcus thermophilus*. Preferably the combination is incubated for 10 minutes to about 6 hours. The temperature during incubation is preferably between 20 and 50° C.

In one embodiment, after incubation the incubated composition is preferably subjected to a heat treatment. By this heat treatment preferably at least 90% of living lactic acid bacteria are inactivated, more preferably at least 95%. Preferably the fermented ingredient, more preferably the infant formula or follow on formula, comprises less than $1 \times 10^5$ colony forming units (cfu) lactic acid bacteria per g dry weight. The heat treatment preferably is performed at a temperature between 80 and 180° C. Inactivation of the lactic acid bacterium advantageously results in less post acidification and a safer product. This is especially advantageous since the infant or follow on formula that is manufactured is to be administered to infants. Thus in one embodiment, the fermented ingredient, more preferably the infant formula or follow on formula, comprises inactivated lactic acid bacteria. Procedures to prepare fermented ingredients suitable for the purpose of the present invention are known per se. EP 778885, which is incorporated herein by reference, discloses in particular in example 7 a suitable process for preparing a fermented ingredient. FR 2723960, which is incorporated herein by reference, discloses in particular in example 6 a suitable process for preparing a fermented ingredient.

Briefly, a milk derived composition, preferably pasteurised, containing lactose and optionally further macronutrients such as fats, preferably vegetable fats, casein, whey protein, vitamins and/or minerals etc. is concentrated, e.g. to between 15 to 50% dry matter and then inoculated with *S. thermophilus*, for example with 5% of a culture containing $10^6$ to $10^{10}$ bacteria per ml. Preferably this milk derived composition comprises milk protein peptides. Temperature and duration of fermentation are as mentioned above. Suitably after fermentation the fermented ingredient may be pasteurised or sterilized and for example spray dried or lyophilised to provide a form suitable to be formulated in the end product.

The bacterial strains of *S. thermophilus* that are preferably used to prepare the fermented ingredient for the purpose of the present invention develop beta-galactosidase activity in the course of fermentation of the substrate. Preferably beta-galactosidase activity develops in parallel with acidity. Selection of a suitable strain of *S. thermophilus* is described in example 2 of EP 778885 and in example 1 of FR 2723960. It is preferred that in the infant or follow on formula according to the method or use of the invention, at least part of the beta-galactosidase activity that has developed during fermentation is retained. Preferably the at least part of the beta-galactosidase activity that is retained is lactase activity. Upon digestion in the infant, lactase activity in the infant or follow on formula has a beneficial effect on promoting intestinal tract health. Preferably according to the present invention, per gram dry weight the infant or follow on formula comprises 0.2-4 U (units) beta-galactosidase activity, preferably the infant or follow on formula comprises per gram dry weight 0.2-4 U lactase activity. A beta-galactosidase activity of 1.0 U (one unit) corresponds to the capacity to hydrolyze 1.0 μmole of o-nitrophenyl β-D-galactopyranoside to o-nitrophenol and D-galactose per min at pH 7.3 at 37° C.

In a further preferred embodiment according to the present invention, the infant or follow on formula comprises at most $1 \times 10^5$ cfu living bacteria of *S. thermophilus*, preferably the infant or follow on formula comprises at most $1 \times 10^4$ cfu living bacteria of *S. thermophilus* based on g dry weight. In one embodiment, preferably not all lactic acid bacteria, preferably not all *S. thermophilus*, is inactivated. Thus preferably the infant or follow on formula comprises at least $1 \times 10^2$ cfu living bacteria of *S. thermophilus*, preferably the infant or follow on formula comprises at least $1 \times 10^3$ cfu living bacteria of *S. thermophilus* per g dry weight.

Preferred strains of *S. thermophilus* to prepare a fermented ingredient, preferably a fermented milk-derived composition, for the purpose of the present invention have been deposited by Compagnie Gervais Danone at the Collection Nationale de Cultures de Microorganismes (CNCM) run by the Institut Pasteur, 25 rue du Docteur Roux, Paris, France on 23 Aug. 1995 under the accession number I-1620 and on 25 Aug. 1994 under the accession number I-1470.

The strains I-1620 and I-1470 have been disclosed in EP 0778885.

Preferably, in the preparation of the fermented ingredient additionally one or more further strains of lactic acid bacteria are present or, either simultaneously or consecutively, the composition additionally is supplemented with or fermented by one or more further strains of lactic acid bacteria. The one or more further strains are each a different strain than the first strain used for fermenting the composition as described above, preferably a different strain than *S. thermophilus*. Such different strains of lactic acid bacteria are preferably selected from the group consisting of *Lactobacillus* and *Bifidobacteria*, more preferably *Bifidobacterium breve*, most preferably *Bifidobacterium breve* strain deposited by Compagnie Gervais Danone at the CNCM under number I-2219 on 31 May 1999. Strain I-2219 has been disclosed in EP 1615657.

In one embodiment, the fermented ingredient comprises *Streptococcus thermophilus*, and/or *Bifidobacterium breve*. In one embodiment, the fermented ingredient is fermented by *Streptococcus thermophilus*, and/or *Bifidobacterium breve*.

In one embodiment, the infant or follow on formula comprises a fermented ingredient, wherein the lactic acid bacteria are inactivated after fermentation.

Preferably the composition that is fermented by lactic acid bacteria is not fermented by *Lactobacillus bulgaricus*. *L.*

*bulgaricus* fermented products are considered not suitable for infants, since in young infants the specific dehydrogenase that converts D-lactate to pyruvate is far less active than the dehydrogenase which converts L-lactate.

The fermented ingredient preferably comprises protein. The protein is preferably selected from the group consisting of non-human animal proteins, preferably non-human milk proteins. The fermented composition preferably contains casein, and/or whey protein, more preferably bovine whey proteins and/or bovine casein.

The infant or follow on formula for use according to the present invention preferably comprises 25 to 100 wt. %, more preferably 30 to 99.5 wt. %, of the fermented ingredient, preferably the fermented milk-derived composition, based on dry weight of the infant or follow on formula. In one embodiment the present infant or follow on formula preferably contains 30 to 99 wt. %, more preferably 30 to 70 wt. %, more preferably 40 to 60 wt. %, of the fermented ingredient, based on dry weight of the final infant or follow on formula. Higher concentrations of fermented composition, e.g. 25, preferably 30 wt. % or above) advantageously improve the effect on colics incidence and crying episodes.

The pH of the present infant or follow on formula is preferably between 5.0 and 7.5, more preferably between 5.0 and 7.0, even more preferably between 5.5 and 7.0, most preferably between 5.5 and 6.0.

The infant or follow on formula for use according to the present invention comprises lactic acid and/or lactate. Lactic acid and/or lactate is formed upon fermentation by lactic acid bacteria. The present infant or follow on formula comprises 0.25 to 1.5 wt. % of the sum of lactic acid and lactate, preferably 0.30 to 1.0 wt. %, more preferably 0.4 to 0.7 wt. % of the sum of lactic acid and lactate based on dry weight of the infant or follow on formula. The more lactate and lactic acid is present the more the infant or follow on formula comprises of the fermented ingredient. Preferably at least 50 wt. %, even more preferably at least 90 wt. %, of the sum of lactic acid and lactate is in the form of L-isomer. Thus in one embodiment the sum of L-lactic acid and L-lactate is more than 50 wt. %, more preferably more than 90 wt. %, based on the sum of total lactic acid and lactate. L-lactate and L-lactic acid is the same as L-(+)-lactate and L-(+) lactic acid. In one embodiment the infant or follow on formula comprises from 0.25 to 1.5 wt. % of the sum of lactate and lactic acid, preferably 0.30 to 1.0 wt. %, of the sum of lactate and lactic acid based on dry weight of the infant or follow on formula and wherein the sum of L-lactic acid and L-lactate is more than 50 wt. % based on the sum of total lactic acid and lactate.

Non-Digestible Oligosaccharides

According to the present invention, the infant or follow on formula comprises non-digestible oligosaccharides. Non-digestible oligosaccharides were found to synergistically act with the fermented ingredient to reduce the incidence of colics and number of crying episodes per day. Advantageously and most preferred, the non-digestible oligosaccharides are water-soluble (according to the method disclosed in L. Prosky et al, J. Assoc. Anal. Chem 71: 1017-1023, 1988) and are preferably oligosaccharides with a degree of polymerisation (DP) of 2 to 200. The average DP of the non-digestible oligosaccharides are preferably below 200, more preferably below 100, even more preferably below 60, most preferably below 40. The non-digestible oligosaccharides are not digested in the intestine by the action of digestive enzymes present in the human upper digestive tract (small intestine and stomach). The non-digestible oligosaccharides are fermented by the human intestinal microbiota. For example, glucose, fructose, galactose, sucrose, lactose, maltose and the maltodextrins are considered digestible. The non-digestible oligosaccharide raw materials may comprise monosaccharides such as glucose, fructose, fucose, galactose, rhamnose, xylose, glucuronic acid, GalNac etc., but these are not part of the non digestible oligosaccharide fraction of the infant or follow on formula according to the present invention.

The non-digestible oligosaccharides included in the infant or follow on formula according to the methods or use according to the present invention preferably include a mixture of at least two different non-digestible oligosaccharides.

The non-digestible oligosaccharides are preferably selected from the group consisting of fructo-oligosaccharides (such as inulin), non-digestible dextrins, galacto-oligosaccharides (such as transgalacto-oligosaccharides), xylo-oligosaccharides, arabino-oligosaccharides, arabinogalacto-oligosaccharides, gluco-oligosaccharides, gentio-oligosaccharides, glucomanno-oligosaccharides, galactomanno-oligosaccharides, mannan-oligosaccharides, isomalto-oligosaccharides, nigero-oligosaccharides, chito-oligosaccharides, soy oligosaccharides, uronic acid oligosaccharides, sialyloligosaccharides (such as 3-sialyllactose (3-SL), 3-sialyllactose (6-SL), lactosialylterasaccharide (LST) a,b,c, disialyllactoNtetraose (DSLNT), sialyl-lactoN-hexaose (S-LNH), sialyl-lactoNhexaose (DS-LNH)), fuco-oligosaccharides (such as (un)sulphated fucoidan oligosaccharides, 2'-fucosyllactose (2'-FL), 3'-fucosyllactose (3-FL), difucosyllactose, lacto-N-fucopenatose (LNFP) I, II, III, V, Lacto-N-neofucopenaose (LNnFP), Lacto-N-difucosyl-hexaose (LNDH)) and mixtures thereof, more preferably selected from the group consisting of fructo-oligosaccharides, galacto-oligosaccharides, uronic acid oligosaccharides, fuco-oligosaccharides and mixtures thereof, even more preferably selected from the group consisting of fructo-oligosaccharides, galacto-oligosaccharides and mixtures thereof. In one embodiment, the non digestible oligosaccharides consist of transgalacto-oligosaccharide, inulin and/or uronic acid oligosaccharides, most preferably at least transgalacto-oligosaccharides are included. In one embodiment, the non digestible oligosaccharides are selected from the group consisting of transgalacto-oligosaccharides, fructo-oligosaccharides and galacturonic acid oligosaccharides and mixtures of thereof.

The non-digestible oligosaccharides are preferably selected from the group consisting of β-galacto-oligosaccharide, α-galacto-oligosaccharide, and galactan. According to a more preferred embodiment non-digestible oligosaccharides are β-galacto-oligosaccharide. Preferably the non-digestible oligosaccharides comprises galacto-oligosaccharides with β(1,4), β(1,3) and/or β(1,6) glycosidic bonds and a terminal glucose. Transgalacto-oligosaccharide is for example available under the trade name Vivinal®GOS (Borculo Domo Ingredients, Zwolle, Netherlands), Bi2muno (Clasado), Cup-oligo (Nissin Sugar) and Oligomate55 (Yakult).

The non-digestible oligosaccharides preferably comprise fructo-oligosaccharides. A fructo-oligosaccharide may in other context have names like fructopolysaccharides, oligofructose, polyfructose, polyfructan, inulin, levan and fructan and may refer to oligosaccharides comprising β-linked fructose units, which are preferably linked by β(2,1) and/or β(2,6) glycosidic linkages, and a preferable DP between 2 and 200. Preferably, the fructo-oligosaccharide contains a terminal β(2,1) glycosidic linked glucose. Preferably, the fructo-oligosaccharide contains at least 7 β-linked fructose units. In a further preferred embodiment inulin is used. Inulin is a type of fructo-oligosaccharide wherein at least 75% of the glycosidic linkages are β(2,1) linkages. Typically, inulin has an average chain length between 8 and 60 monosaccharide units. A suitable fructo-oligosaccharide for use in the compositions of the present invention is commercially available under the trade name Raftiline®HP (Orafti). Other suitable sources are raftilose (Orafti), fibrulose and fibruline (Cosucra) and Frutafit and frutalose (Sensus).

Preferably the infant or follow on formula comprises a mixture of galactooligosaccharides and fructooligosaccharides in a weight ratio of from 1/99 to 99/1, more preferably from 1/19 to 19/1, even more preferably from 1 to 19/1.

Preferably the infant or follow on formula comprises a mixture of short chain fructooligosaccharides, and long chain fructooligosaccharides in a weight ratio of from 1/99 to 99/1, more preferably from 1/19 to 19/1, even more preferably from 1 to 19/1.

Preferably the infant or follow on formula comprises a mixture of β1,3 galactooligosaccharides and β1,4 and/or β1,6 galactooligosaccharides, in a weight ratio of from 1/99 to 99/1, more preferably from 1/19 to 19/1, even more preferably from 1/19 to 1.

Preferably the infant or follow on formula comprises a mixture of transgalacto-oligosaccharide with an average DP below 10, preferably below 6 and a fructo-oligosaccharide with an average DP below 10, preferably below 6.

Most preferably the infant or follow on formula comprises a mixture of fructo-oligosaccharide with an average DP below 10, preferably below 6 and a fructo-oligosaccharide with an average DP above 7, preferably above 11, even more preferably above 20.

Most preferred is a mixture of transgalacto-oligosaccharide with an average DP below 10, preferably below 6 and a fructo-oligosaccharide with an average DP above 7, preferably above 11, even more preferably above 20.

The present infant or follow on formula comprises 0.5 to 20 wt. % total non-digestible oligosaccharide, more preferably 1 to 10 wt. %, even more preferably 2 to 10 wt. %, most preferably 2.0 to 7.5 wt. %, based on dry weight of the present infant or follow on formula.

Based on 100 ml, the present infant or follow on formula, when in liquid form, e.g. as a ready-to-feed liquid, preferably comprises 0.1 to 2.5 wt. % non-digestible oligosaccharide, more preferably 0.2 to 1.5 wt. %, even more preferably 0.4 to 1.5 wt. %, based on 100 ml of the present infant or follow on formula.

Infant or Follow on Formula

Infant formula relates to a nutritional composition for particular nutritional uses by infants during the first months of life and satisfying by themselves the nutritional requirements of such infants until the introduction of appropriate complementary feeding. Infant formula is sometimes also referred to as a starter formula or a stage 1 formula. Typically an infant formula is used until the infant has reached an age of 4 to 6 months.

Follow on formula relates to a nutritional composition for particular nutritional use by infants when appropriate complementary nutrition is introduced and constituting the principal liquid element in a progressively diversified diet of such infants. Follow on formula is sometimes also referred to as a stage 2 (infant) formula. Typically a follow on formula is used from 4-6 month of age to 12 months of age.

An infant is a human child with an age of 0 to 12 months.

Infant and follow on formula is subjected to international regulatory legislation. Codex-Stan 72-1981 gives the international standard for infant formula and formula for special medical purposes intended for infants. In Europe for example infant and follow on formula further have to comply with the Commission Directive 2006/141/EC of 22 Dec. 2006 on infant formulae and follow-on formulae. GB 10765-2010 and GB 10767-2010 are the national food safety standards for infant formula and older infants and young children formula in China. In the United States, US Food and Drug Administration 21 CFR Ch 1 part 107 applies to infant formulae. In a preferred embodiment, the present infant formula or follow on formula as used according to the present invention complies with the appropriate legislation.

The present infant or follow on formula is preferably particularly suitable for providing the complete daily nutritional requirements to a human subject with an age below 12 months, more preferably below 6 months. The present nutritional composition is not a yogurt, since yoghurt contains by convention *L. bulgaricus* (Codex Standard for fermented Milks Codex Stan 243-2003).

The present infant or follow on formula comprises a digestible carbohydrate component. Preferred digestible carbohydrate components are lactose, glucose, sucrose, fructose, galactose, maltose, starch and maltodextrin. Lactose is the main digestible carbohydrate present in human milk. The present infant or follow on formula preferably comprises lactose. As the present infant or follow on formula comprises a composition fermented by lactic acid bacteria, the amount of lactose is reduced compared to its source due to the fermentation whereby lactose is converted into lactate and/or lactic acid. Therefore in the preparation of the present infant or follow on formula lactose is preferably added. Preferably the present infant or follow on formula does not comprise high amounts of carbohydrates other than lactose. Compared to digestible carbohydrates such as maltodextrin, sucrose, glucose, maltose and other digestible carbohydrates with a high glycemic index, lactose has a lower glycemic index and is therefore preferred. The present infant or follow on formula preferably comprises digestible carbohydrate, wherein at least 35 wt. %, more preferably at least 50 wt. %, more preferably at least 60 wt. %, more preferably at least 75 wt. %, even more preferably at least 90 wt %, most preferably at least 95 wt % of the digestible carbohydrate is lactose. Based on dry weight the present infant or follow on formula preferably comprises at least 25 wt. % lactose, preferably at least 40 wt. %, more preferably at least 50 wt % lactose.

When in liquid form, e.g. as a ready-to-feed liquid, the infant or follow on formula preferably comprises 3.0 to 30 g digestible carbohydrate per 100 ml, more preferably 6.0 to 20, even more preferably 7.0 to 10.0 g per 100 ml. Based on dry weight the present infant or follow on formula preferably comprises 20 to 80 wt. %, more preferably 40 to 65 wt. % digestible carbohydrates. Based on total calories the infant or follow on formula preferably comprises 9 to 14 g digestible carbohydrates per 100 kcal.

The present infant or follow on formula comprises a lipid component. The lipid component of the present infant or follow on formula provides 2.9 to 6.0 g, more preferably 4 to 6 g per 100 kcal of the infant or follow on formula. When in liquid form, e.g. as a ready-to-feed liquid, the infant or follow on formula preferably comprises 2.1 to 6.5 g lipid per 100 ml, more preferably 3.0 to 4.0 g per 100 ml. Based on dry weight the present infant or follow on formula preferably comprises 12.5 to 40 wt. % lipid, more preferably 19 to 30 wt. %.

The lipid component comprises the essential fatty acids alpha-linolenic acid (ALA), linoleic acid (LA) and preferably long chain polyunsaturated fatty acids (LC-PUFA). The LC-PUFA, LA and/or ALA may be provided as free fatty acids, in triglyceride form, in diglyceride form, in monoglyceride form, in phospholipid form, or as a mixture of one of more of the above. Preferably the present infant or follow on formula contains at least one, preferably at least two lipid sources selected from the group consisting of rape seed oil (such as colza oil, low erucic acid rape seed oil and canola oil), high oleic sunflower oil, high oleic safflower oil, olive oil, marine oils, microbial oils, coconut oil, palm kernel oil and milk fat.

The present infant or follow on formula comprises a protein component. The protein used in the infant or follow on formula is preferably selected from the group consisting of non-human animal proteins, preferably non-human milk proteins, vegetable proteins, such as preferably soy protein and/or rice protein, and mixtures thereof. The present nutritional composition preferably contains casein, and/or whey protein, more preferably bovine whey proteins and/or bovine casein. Thus in one embodiment the protein component comprises protein selected from the group consisting of whey protein and casein, preferably both whey protein and casein, and preferably the whey protein and/or casein is from cow's milk Preferably the protein comprises less than 5 wt. % based on total protein of free amino acids, dipeptides, tripeptides or hydrolyzed protein. The present nutritional composition preferably comprises casein and whey proteins in a weight ratio casein:whey protein of 10:90 to 90:10, more preferably 20:80 to 80:20, even more preferably 35:65 to 55:45.

The present infant or follow on formula comprises protein providing 1.8 to 5.5, preferably 1.8 to 3.5 g protein per 100 kcal of the infant or follow on formula, preferably providing 1.8 to 2.5 g per 100 kcal of the infant or follow on formula. In one embodiment, the infant or follow on formula according to the invention comprises protein preferably in an amount of 2.0 g per 100 kcal or less. When in liquid form, e.g. as a ready-to-feed liquid, the infant or follow on formula preferably comprises 0.5 to 6.0 g, more preferably 1.0 to 3.0 g, even more preferably 1.0 to 1.5 g protein per 100 ml, most preferably 1.0 to 1.3 g protein per 100 ml. Based on dry weight the present infant or follow on formula comprises 5 to 20 wt. % protein, preferably at least 8 wt. % protein based on dry weight of the infant or follow on formula, more preferably 8 to 14 wt. %, even more preferably 8 to 9.5 wt. % protein based on dry weight of the infant or follow on formula.

The wt. % protein based on dry weight of the present infant or follow on formula is calculated according to the Kjeldahl-method by measuring total nitrogen and using a conversion factor of 6.38 in case of casein, or a conversion factor of 6.25 for other proteins than casein. The term 'protein' or 'protein component' as used in the present invention refers to the sum of proteins, peptides and free amino acids.

Preferably the lipid component provides 2.9 to 6 g lipid per 100 kcal, preferably the protein component provides 1.8 to 5.5 g per 100 kcal, preferably 1.8 to 2.5 g per 100 kcal and preferably the digestible carbohydrate component provides 9 to 14 g per 100 kcal, of the final infant or follow on formula, wherein preferably the digestible carbohydrate component comprises at least 60 wt. % lactose based on total digestible carbohydrate, more preferably at least 75 wt. %, even more preferably at least 90 wt. % lactose based on total digestible carbohydrate. The amount of total calories is determined by the sum of calories derived from protein, lipids, digestible carbohydrates and non digestible oligosaccharides.

In one embodiment the infant or follow on formula is in a liquid form. In another embodiment the infant or follow on formula is in the form of a powder, preferably a powder suitable for making a liquid ready to drink infant or follow on formula after reconstitution with an aqueous solution, preferably with water. Preferably the infant or follow on formula is a powder to be reconstituted with water. Preferably the liquid composition has a viscosity below 100 mPa·s, more preferably below 60 mPa·s, more preferably below 35 mPa·s, even more preferably below 6 mPa·s as measured in a Brookfield viscometer at 20° C. at a shear rate of 100 s$^{-1}$. A low viscosity is important for infant or follow on formula, since it mimics the viscosity of breast milk and can then be administered via a teat. Preferably according to the present invention the nutritional composition has a viscosity when administered close to that of human milk. Thus in one embodiment according to the present invention the nutritional composition does not comprise a thickener, preferably it does not comprise a thickener selected form the group consisting of locust bean gum, tara gum, gum tragacanth, guar gum, and fenugreek gum, preferably it does not comprise any of locust bean gum, tara gum, gum tragacanth, guar gum or fenugreek gum.

In order to meet the caloric requirements of an infant, the infant or follow on formula preferably comprises 60 to 85, more preferably 60 to 70 kcal/100 ml liquid. This caloric density ensures an optimal ratio between water and calorie consumption. The osmolarity of the present composition is preferably between 150 and 420 mOsmol/l, more preferably 260 to 320 mOsmol/l. The low osmolarity aims to further reduce the gastrointestinal stress.

When the infant or follow on formula is in a liquid form, the preferred volume administered on a daily basis is in the range of about 80 to 2500 ml, more preferably about 200 to 1200 ml per day. Preferably, the number of feedings per day is between 1 and 10, preferably between 3 and 8. In one embodiment the infant or follow on formula is administered daily for a period of at least 2 days, preferably for a period of at least 7 days, preferably for a period of at least 2 weeks, preferably for a period of at least 4 weeks, preferably for a period of at least 8 weeks, more preferably for a period of at least 12 weeks, in a liquid form wherein the total volume administered daily is between 200 ml and 1200 ml and wherein the number of feedings per day is between 1 and 10.

Application

The present inventors found that when a partly fermented infant formula comprising non digestible oligosaccharides was administered to infants, the incidence of colics and the number of crying episodes per day was statistically significantly reduced compared to the study groups of infants to whom partly fermented infant formula without non digestible oligosaccharides were given, or when non-fermented infant formula with non digestible oligosaccharides were given. Also it was found that the duration of crying was statistically significantly decreased compared to the study group of infants receiving non-fermented infant formula without non digestible oligosaccharides.

The present infant or follow on formula is used for providing nutrition to an infant, a human subject with an age of 0 to 12 months. The present infant or follow on formula is preferably orally administered. As colics and crying episodes are particularly prominent in young infants, the present formula is preferably an infant formula and/or the formula is used for providing nutrition to a human subject with an age of 0 to 6 months, more preferably 0 to 4 months.

Colics are defined as a duration of crying for more than three hours a day, for at least three days a week.

Reduction in colics is to be understood as a reduction in colics in an infant administered with the infant or follow on formula according to the invention, compared to an infant administered with an infant or follow on formula containing only a partly fermented infant formula without non-digestible oligosaccharides as defined herein or compared to an infant administered with a non-fermented infant formula that contained non-digestible oligosaccharides as defined herein.

Reduced number of crying episodes per day is to be understood as a lower absolute number of crying episodes per day in an infant administered with the infant or follow on formula according to the invention, compared to an infant administered with an infant or follow on formula containing only a partly fermented infant formula without non-digestible oligosaccharides as defined herein or compared to an infant administered with a non-fermented infant formula that contained non-digestible oligosaccharides as defined herein.

Episodes of crying per day is the same as number of crying times per day.

Duration of crying refers to the length in time of a crying episode.

In one embodiment, the present invention concerns reducing the incidence of colics in an infant and reducing the number of crying episodes per day in an infant by administering an infant formula or follow on formula comprising a fermented ingredient and non-digestible oligosaccharides as defined herein above. In one embodiment, the present invention concerns reducing the incidence of colics in an infant and decreasing the duration of crying in an infant by administering an infant formula or follow on formula comprising a fermented ingredient and non-digestible oligosaccharides as defined herein above. In one embodiment, the present invention concerns reducing the number of crying episodes per day in an infant and decreasing the duration of crying in an infant by administering an infant formula or follow on formula comprising a fermented ingredient and non-digestible oligosaccharides as defined herein above. In one embodiment, the present invention concerns reducing the incidence of colics in an infant and reducing the number of crying episodes per day in an infant and decreasing the duration of crying in an infant by administering an infant formula or follow on formula comprising a fermented ingredient and non-digestible oligosaccharides as defined herein above.

In this document and in its claims, the verb "to comprise" and its conjugations is used in its non-limiting sense to mean that items following the word are included, but items not specifically mentioned are not excluded. In addition, reference to an element by the indefinite article "a" or "an" does not exclude the possibility that more than one of the element is present, unless the context clearly requires that there be one and only one of the elements. The indefinite article "a" or "an" thus usually means "at least one. Wt. means weight.

Examples

1) Effect of a Formula Comprising a Fermented Composition and Non Digestible Oligosaccharides on Incidence of Colics and Number of Crying Episodes in Infants Healthy full-term (≥37 weeks and ≤42 weeks) infants whose mothers had decided not to start breastfeeding or had already stopped breastfeeding at the time of information about the study were recruited. At the time of enrolment, the infants had to be ≤28 days old and a birth weight between 2.5-4.5 kg, or within normal range for gestational age and sex ($10^{th}$ to $90^{th}$ percentile according to the locally applicable growth charts. Infants were excluded if they 1) were diagnosed with a congenital condition and/or current illnesses that could interfere with the study 2) had an increased risk for cow's milk protein allergy or known cow's milk protein allergy, soy allergy and/or lactose allergy 3) have a mother who suffered from diabetes during pregnancy 4) were already participating in another clinical trial. Written informed consent was obtained from either both parents or legal representatives of all participants. A number of 431 infants were considered for the intention to treat (ITT) analysis.

Participants were randomised to receive one of the four investigational products, which were all complete standard cow's milk-based infant formula: test diet 1 containing 50% Lactofidus™ and a specific mixture of 90% short-chain galacto-oligosaccharides (scGOS) and 10% long-chain fructo-oligosaccharides (lcFOS) or test diet 2 containing 15% Lactofidus™ and the specific mixture of 90% scGOS and 10% lcFOS or control diet 3 containing only 50% Lactofidus™ or control diet 4 containing only the specific mixture of 90% scGOS and 10% lcFOS. All products were produced by Danone, Steenvoorde, France. This was a prospective, randomized, double-blinded, controlled, parallel-group, multicenter, clinical study, conducted in 24 sites in three countries (Ireland (7 sites), Belgium (10 sites), France (7 sites). At enrolment, baseline measurements were taken and infants were randomly assigned to receive one of the two test or one of the two control diets. Parents were given the assigned infant formula and instructions for its preparation and were advised to feed infants ad libitum. They were also provided with a diary and asked to keep record of their infants crying and sleeping duration, providing the total duration in hours/day and the number of crying episodes/day. Growth measurements were taken. The primary outcome was weight gain and secondary outcomes were recumbent length and head circumference. Also crying and sleeping were evaluated based on records kept by the parents. Diaries were included in the statistical analysis if there were at least 3 days recorded.

At 4 weeks the number of crying episodes (times per day) was analysed by using wilcoxon rank sum test.

The incidence of colics was defined based on the parent reported duration of crying in the diaries. Colics were defined as "YES" (present), according to adopted Wessel criteria if the children had for at least 3 days a duration of crying for 3 hours per day. The analysis was performed by using Chi-square test/fisher's exact test.

The following diets were tested:

Diet 1 Infant formula 1 comprising per 100 ml 66 kcal, 1.35 g protein (bovine whey protein/casein in 1/1 weight ratio), 8.2 g digestible carbohydrate (of which 5.6 g lactose, and 2.1 g maltodextrin), 3.0 g fat (mainly vegetable fat), 0.8 g non-digestible oligosaccharides of scGOS (source Vivinal® GOS) and lcFOS (source RaftilinHP®) in a 9:1 wt ratio.

Of this infant formula 50% based on dry weight is derived from Lactofidus™, a commercially available infant formula marketed under brand name Gallia. Lactofidus™ is a 100% fermented milk derived composition and is produced by fermenting with *S. thermophilus* and comprises *B. breve*. A heat treatment is employed to inactivate the lactic acid bacteria.

The infant formula comprises about 0.55 wt. % lactic acid+lactate based on dry weight, of which at least 95% is L-lactic acid/lactate. The composition further comprises vitamins, minerals, trace elements and other micronutrients according to international directive 2006/141/EC for infant formula.

Diet 2 Infant formula 2, similar to infant formula 1, but comprising 15% wt % Lactofidus™ instead of 50%, and hence about 0.16 wt % lactic acid+lactate.

Diet 3 Infant formula 3, similar to infant formula 1, but without the 0.8 g non-digestible oligosaccharides of scGOS (source Vivinal® GOS) and lcFOS (source RaftilinHP®) in a 9:1 wt ratio.

Diet 4 Infant formula 4, a non fermented infant formula with 0.8 g non-digestible oligosaccharides of scGOS (source Vivinal® GOS) and lcFOS (source RaftilinHP®) in a 9:1 wt ratio, and for the remainder with similar composition as infant formula 1.

Results:

Population

In total 431 infants were included and randomised. There was no statistically significant difference in the dropout rates between the test and control groups (Fisher's exact test, P>0.05).

Crying and Colics

At 4 weeks mean crying episodes were lowest in the group receiving diet 1 (3.03±sd 1.92), in the group receiving diet 2 the mean was 3.64±2.19, in the group receiving diet 3 3.72±1.98 and in the group receiving diet 4 3.46±1.92. However since the data are not normally distributed, the value of the median is more relevant. At 4 weeks the median number of crying episodes per day was lowest in the group of infants having consumed diet 1 (50% Lactofidus™ with scGOS/lcFOS). At 4 weeks, the number of crying episodes per day was significantly lower in the group receiving diet 1 (50% Lactofidus™ with scGOS/lcFOS) compared to the control group receiving diet 3 (50% Lactofidus™) (median: 2.6 vs. versus 3.4 times/day, Wilcoxon rank sum test, p=0.030), see table 1 showing the results for the ITT (intention to treat) group. The number of crying episodes was also lower compared to the group fed with diet 4 (0% Lactofidus™ with scGOS/lcFOS). Diet 2 (15% Lactofidus™ with scGOS/lcFOS) was less effective in reducing number of crying episodes per day than diet 1.

At 4 weeks the incidence of colics was lowest in the group of infants having consumed diet 1 (50% Lactofidus™ with scGOS/lcFOS). The incidence of colics was lowest in the test group having consumed diet 1 (50% Lactofidus™ with scGOS/lcFOS) and significant different compared to control group having consumed diet 3 (50% Lactofidus™) (8% vs. versus 20%, Chi-square test, P=0.036), and control group having consumed diet 4 (scGOS/lcFOS) (8% vs. versus 20%, Chi-square test, P=0.034), see table 2 showing the results of the ITT group. Diet 2 (15% Lactofidus™ with scGOS/lcFOS) was less effective than diet 1, in reducing incidence of colics.

TABLE 1

Number of crying episodes at 4 weeks (times/day)

| | Baseline mean | 4 weeks mean | Baseline median (range) | 4 weeks median (range) | P-value |
|---|---|---|---|---|---|
| diet 1 (50% LF + prebiotics; N = 109) | 4.15 ± 2.32 (n = 86) | 3.03 ± 1.92 (n = 74) | 4.0 (0.0-9.0) | 2.6 (0.0-7.6) | 0.100[a] 0.030[b] 0.072[c] |
| diet 2 (15% LF + prebiotics; N = 111) | 3.88 ± 2.36 (n = 93) | 3.64 ± 2.19 (n = 72) | 4.0 (0.0-8.0) | 3.6 (0.0-9.4) | 0.591[a] |
| diet 3 (50% LF; N = 107) | 4.31 ± 2.45 (n = 87) | 3.72 ± 1.98 (n = 70) | 5.0 (0.0-10.0) | 3.4 (0.0-8.7) | |
| diet 4 (prebiotics; N = 104) | 3.56 ± 2.26 (n = 86) | 3.46 ± 1.92 (n = 75) | 3.0 (0.0-8.0) | 3.4 (0.0-9.3) | |

N is the total number of infants in the intention to treat group, n is number of infants contributing to analysis Diary was included in analysis if there were at least 3 days recorded. Statistical relevance was calculated using Wilcoxon rank sum test;
[a]vs. diet 4;
[b]vs. diet 3;
[c]vs. diet 2.

TABLE 2 incidence of colics at 4 weeks (adapted from the Wessel criteria)

| incidence of colics at 4 weeks | No n (%) | Yes n (%) | P-value |
|---|---|---|---|
| diet 1 (50% LF + prebiotics; N = 109) | 69 (92.0) | 6 (8.0) | 0.034[a] 0.036[b] 0.109[c] |
| diet 2 (15% LF + prebiotics; N = 111) | 60 (83.3) | 12 (16.7) | 0.602[a] |
| diet 3 (50% LF; N = 107) | 56 (80.0) | 14 (20.0) | |
| diet 4 (prebiotics; N = 104) | 60 (80.0) | 15 (20.0) | |

N is the total number of the infants in the ITT group, n is number of infants contributing to analysis. Colics are defined as 'Yes' if infant has a crying duration of at least 3 hours per day for at least 3 days a week. Baseline is not included, because there was no 7 day diary at baseline. Diary was included in analysis if there were at least 3 days recorded. P-value was calculated using Chi-square test: [a]vs. diet 4; [b]vs. diet 3; [c]vs. diet 2.

2) Effect of a Formula Comprising a Fermented Composition and Non Digestible Oligosaccharides on Incidence of Colics in Infants.

A clinical trial was performed with similar assessments and visit as above. In this clinical trial 200 subjects were randomized to either diet 5 or Diet 6.

A number of 199 infants were considered for the intention to treat (ITT) analysis and n=198 for the all-subjects treated (AST). Subjects were randomized to receive one of the two diets, which were all complete standard cow's milk-based infant formula. This was a prospective, randomized, double-blinded, controlled, parallel-group, multicenter, clinical study, conducted in two countries, Italy and Spain.

Parents completed standardized diaries to assess crying duration. For every subject the crying duration per day (h/day) was calculated.

Excessive crying was defined as a crying duration>3 h/day. The incidence of colics was defined based on the parent reported duration of crying in the diaries. Colics were defined as "YES" (present), according to adapted Wessel criteria if the children had for at least 3 days within a period of 7 days a duration of crying for 3 hours per day. The analysis was performed by using repeated measures logistic regression.

Diet 5: Infant formula comprising per 100 ml 66 kcal, 1.2 g protein (bovine whey protein/casein in 1/1 weight ratio), 7.7 g digestible carbohydrate (of which 7.6 g lactose), 3.4 g fat (mainly vegetable fat), 0.8 g non-digestible oligosaccharides of scGOS (source Vivinal® GOS) and lcFOS (source RaftilinHP®) in a 9:1 wt ratio.

Of this infant formula 30% based on dry weight was derived from Lactofidus™. The infant formula comprised about 0.33 wt. % lactic acid+lactate based on dry weight, of which at least 95% is L-lactic acid+L-lactate. The composition further comprised vitamins, minerals, trace elements and other micronutrients according to international directive 2006/141/EC for infant formula.

Diet 6: Infant formula, similar to infant formula of diet 5, but did not comprise Lactofidus™ and no added non-digestible oligosaccharides of scGOS and lcFOS.

Results:
Population

In total 200 infants were randomised. There was no statistically significant difference in the number of early terminations between the test and control groups (Chi-square test, P>0.05).

Crying and Colics

It was found that of the infants with an age>7 days after start of using the study diet, the duration of crying, the incidence of excessive crying, and incidence of colics was lower in the infants receiving diet 5 when compared to the infants receiving diet 6. For the statistic effects, see table 3 below.

TABLE 3

| Statistical analysis | | |
| --- | --- | --- |
|  | p-value test vs. control treatment for subgroup >7 days after start of study diet use | p-value test vs. control treatment for subgroup >21 days after start of study diet use |
| ITT Crying duration | 0.0200 (n = 123) | <0.0001 (n = 64) |
| ITT Excessive Crying | <0.0001 (n = 123) | 0.0048 (n = 64) |
| ITT Colics | 0.1222 (n = 122) | 0.0449 (n = 64) | n is number of infants contributing to analysis

Furthermore in the AST population infantile colics registered by the investigator as adverse effect was significantly lower in the infants consuming diet 5 (1 out of 94 infants, 1.1%) compared to infants consuming diet 6 (9 out of 104 infants, 8.7%) (p-value 0.020).

The invention claimed is:

1. A method of reducing the incidence of colic in an infant, comprising administering daily for a period of at least 4 weeks to the infant between 0 and 6 months of age an infant formula composition, comprising:
    (a) about 40 to about 60 wt. % of a milk-derived fermented ingredient based on dry weight of the composition;
    (b) about 0.4 to about 1.5 wt. % galacto-oligosaccharides and fructo-oligosaccharides based on 100 ml of the composition; and
    (c) about 0.3 to about 0.7 wt. % of the sum of lactate and lactic acid based on dry weight of the composition, wherein the sum of L-lactic acid and L-lactate is more than 95 wt. % based on the sum of total lactic acid and lactate; and
    wherein the milk-derived fermented ingredient is fermented by *Streptococcus thermophilus* and/or *Bifidobacterium breve*.

2. The method according to claim 1, wherein the infant is 4 months of age or younger.

3. The method according to claim 1, wherein the composition comprises 0.2-4 U beta-galactosidase activity per g dry weight of the composition.

4. The method according to claim 1, wherein the composition comprises *Streptococcus thermophilus* and/or *Bifidobacterium breve*.

5. The method according to claim 1, wherein the composition comprises at most $1\times10^5$ cfu of lactic acid bacteria per g dry weight of the composition.

6. The method according to claim 1, wherein the composition comprises $1\times10^2$-$1\times10^5$ cfu *Streptococcus thermophilus* per g dry weight of the composition.

7. The method according to claim 1, wherein the composition comprises inactivated lactic acid bacteria.

8. The method according to claim 1, wherein the composition is reconstituted from a powder with water.

9. A method of reducing the number of crying episodes per day in an infant, comprising administering daily for a period of at least 4 weeks to the infant between 0 and 6 months of age an infant formula composition, comprising:
    (a) about 40 to about 60 wt. % of a milk-derived fermented ingredient based on dry weight of the composition;
    (b) about 0.4 to about 1.5 wt. % galacto-oligosaccharides and fructo-oligosaccharides based on 100 ml of the composition; and
    (c) about 0.3 to about 0.7 wt. % of the sum of lactate and lactic acid based on dry weight of the composition, wherein the sum of L-lactic acid and L-lactate is more than 95 wt. % based on the sum of total lactic acid and lactate; and
    wherein the milk-derived fermented ingredient is fermented by *Streptococcus thermophilus* and/or *Bifidobacterium breve*.

10. A method of decreasing the duration of crying in an infant, comprising administering daily for a period of at least 4 weeks to the infant between 0 and 6 months of age an infant formula composition, comprising:
    (a) about 40 to about 60 wt. % of a milk-derived fermented ingredient based on dry weight of the composition;
    (b) about 0.4 to about 1.5 wt. % galacto-oligosaccharides and fructo-oligosaccharides based on 100 ml of the composition; and
    (c) about 0.3 to about 0.7 wt. % of the sum of lactate and lactic acid based on dry weight of the composition, wherein the sum of L-lactic acid and L-lactate is more than 95 wt. % based on the sum of total lactic acid and lactate; and
    wherein the milk-derived fermented ingredient is fermented by *Streptococcus thermophilus* and/or *Bifidobacterium breve*.

11. The method according to claim 1, wherein the nutritional composition comprises *Streptococcus thermophilus*, and in an amount no greater than $1\times10^4$ cfu per gram of dry weight of the nutritional composition.

* * * * *